(12) United States Patent
Jacob

(10) Patent No.: US 12,427,694 B2
(45) Date of Patent: Sep. 30, 2025

(54) MOLD PART

(71) Applicant: HS 3D Performance GmbH, Lengenfeld (DE)

(72) Inventor: Jonas Jacob, Lengenfeld (DE)

(73) Assignee: HS 3D Performance GmbH, Lengenfeld (DE)

( * ) Notice: Subject to any disclaimer, the term of this patent is extended or adjusted under 35 U.S.C. 154(b) by 169 days.

(21) Appl. No.: 17/927,125

(22) PCT Filed: May 27, 2021

(86) PCT No.: PCT/EP2021/064148
§ 371 (c)(1),
(2) Date: Nov. 22, 2022

(87) PCT Pub. No.: WO2021/244929
PCT Pub. Date: Dec. 9, 2021

(65) Prior Publication Data
US 2023/0191657 A1      Jun. 22, 2023

(30) Foreign Application Priority Data

Jun. 2, 2020   (DE) .................... 10 2020 114 658.2

(51) Int. Cl.
*B28B 7/24*     (2006.01)
*B22F 5/00*     (2006.01)
(Continued)

(52) U.S. Cl.
CPC .............. *B28B 7/241* (2013.01); *B22F 5/007* (2013.01); *B22F 7/062* (2013.01); *B22F 7/08* (2013.01);
(Continued)

(58) Field of Classification Search
CPC ......... B28B 7/241; B28B 7/346; B28B 7/183; B22F 5/007; B22F 7/08; B22F 7/062; B33Y 80/00
See application file for complete search history.

(56) References Cited

U.S. PATENT DOCUMENTS 5,062,610 A * 11/1991 Woolford ................ E04C 1/395
249/98
10,625,341 B2  4/2020 Cheng et al.
(Continued)

FOREIGN PATENT DOCUMENTS

DE    10 2017 109 810 A1    11/2017
EP       3 053 678 A1         8/2016
(Continued)

OTHER PUBLICATIONS

International Search Report in PCT/EP2021/064146, dated Sep. 20, 2021.
(Continued)

*Primary Examiner* — James Sanders
(74) *Attorney, Agent, or Firm* — Collard & Roe, P.C.

(57) ABSTRACT

A mold part of a modular concrete block mold has an additively manufactured region or is an additively manufactured mold part. The additively manufactured region may be a 3D metal printing region or the additively manufactured mold part may be a 3D metal printing mold part. The mold part may have a milled or cast region and the additively manufactured region.

13 Claims, 3 Drawing Sheets

(51) Int. Cl.
    *B22F 7/06*           (2006.01)
    *B22F 7/08*           (2006.01)
    *B28B 7/18*           (2006.01)
    *B28B 7/34*           (2006.01)
    *B33Y 80/00*         (2015.01)

(52) U.S. Cl.
    CPC .............. *B28B 7/183* (2013.01); *B28B 7/346* (2013.01); *B33Y 80/00* (2014.12); *B22F 2998/00* (2013.01)

(56) References Cited

U.S. PATENT DOCUMENTS

| | | |
|---|---|---|
| 2018/0345616 A1 | 12/2018 | Matlack et al. |
| 2020/0198058 A1 | 6/2020 | Ootaki |

FOREIGN PATENT DOCUMENTS

| | | |
|---|---|---|
| JP | 2019-136708 A | 8/2019 |
| RU | 180772 U1 | 6/2018 |
| WO | 2018/225803 A1 | 12/2018 |

OTHER PUBLICATIONS

International Search Report in PCT/EP2021/064148, dated Sep. 20, 2021.

\* cited by examiner

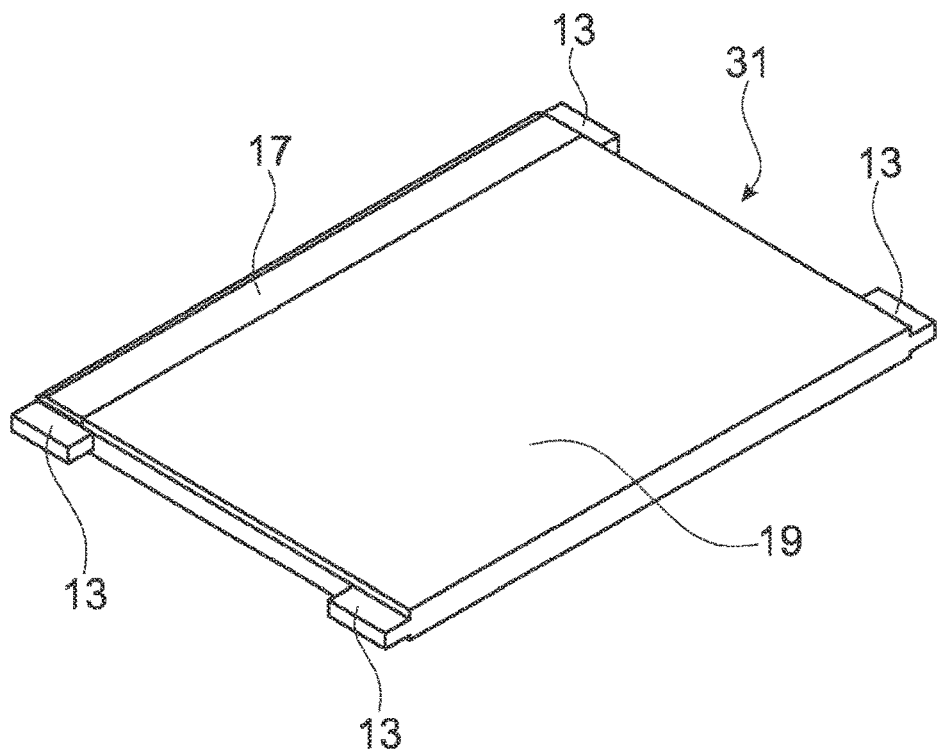
Fig. 2A
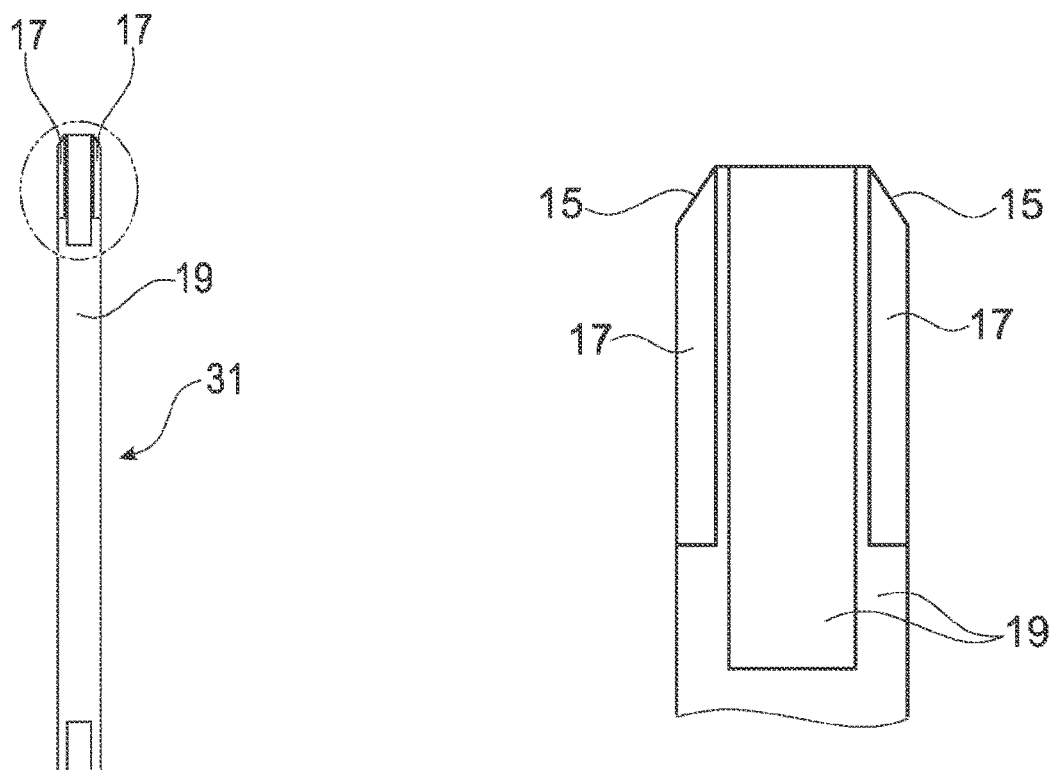
Fig. 2B
Fig. 2C

MOLD PART

CROSS REFERENCE TO RELATED APPLICATIONS

This application is the National Stage of PCT/EP2021/064148 filed on May 27, 2021, which claims priority under 35 U.S.C. § 119 of German Application No. 10 2020 114 658.2 filed on Jun. 2, 2020, the disclosure of which is incorporated by reference. The international application under PCT article 21 (2) was not published in English.

The invention relates to a mold part of a modular concrete block mold. Such a concrete block mold is assembled from a plurality of mold parts.

Concrete block molds are used to produce shaped blocks. A concrete mixture is poured into the concrete block mold, and a block machine compacts the concrete mixture in the concrete block mold to create a concrete block. The concrete block mold comprises a lower mold part, in one or more mold cavities of which the concrete mixture is filled, and an upper mold part having a stamping unit for compacting the concrete mixture in the mold cavities. The stamping unit comprises pressure plates that can engage in the mold cavities of the lower mold part. The lower mold part is open at the top and bottom, with the lower face being closed by a horizontal base. The concrete mixture is poured in through the upper openings of the mold cavities and then pressed by the pressure plates, by said plates being lowered into the mold cavities through the upper openings by means of a load unit. By shaking the base, the concrete mixture solidifies to form dimensionally stable concrete mold parts. In a final step, the concrete mold parts are demolded through the lower openings of the mold cavities.

Hollow blocks are produced using a concrete block mold, in which cores are also placed in the recesses, so that the concrete mixture is pushed into the space between the recess wall and the core. The pressure plates used in hollow block manufacture have cutouts of which the shape corresponds to the shape of the core, so that the pressure plates can be pressed down along the upper core region during pressing.

A concrete block mold in a modular design comprises a plurality of mold parts that are detachably connected to form a concrete block mold. The modular design allows individual mold parts to be replaced, so that when individual mold parts wear out, the entire concrete block mold does not have to be replaced and, in contrast to concrete block molds having permanently welded mold parts, a more economical and sustainable use of the concrete block mold is possible. The replacement mold parts, like the mold parts of the concrete block mold, are manufactured using conventional metalcutting manufacturing processes and/or casting processes.

The problem addressed is that of providing an alternative mold part for a modular concrete block mold.

The mold part of a modular concrete block mold for solving the problem has an additively manufactured region or is an additively manufactured mold part. In other words: Such a mold part is additively manufactured at least in some regions. Another region of the mold part, if not entirely additively manufactured, is conventionally manufactured, for example milled or cast. The connection between the additively manufactured region and the conventionally manufactured region can be made using suitable connecting means, for example welded joints, adhesively bonded joints, fastening means such as screws, or by the additively manufactured region being printed onto the conventionally manufactured region. Depending on the connection between the regions, the mold part is designed in one piece or in multiple pieces.

The additive manufacturing of mold parts has hitherto been unknown in mold making for block-making machines. Additive manufacturing processes are automated processes that produce three-dimensional physical objects from a data set. To do this, volume elements are added to one another in layers, so that no mold-part-dependent tools are required. Additive manufacturing processes are also referred to as 3D printing. In view of the loads to which the concrete block mold is exposed, the mold part or at least its additively manufactured region is advantageously manufactured from metal using a 3D metal printing process. In 3D metal printing, an energy source, such as a laser, sinters or melts a metal powder to produce the object to be manufactured, usually layer by layer. The powder can be present in a powder bed or projected by means of a nozzle. In this way, a metal additively manufactured region, i.e. a 3D metal printed region, or a metal additively manufactured mold part, i.e. a 3D metal printed mold part, can be manufactured.

A person skilled in the art can distinguish additively manufactured regions and mold parts from conventionally manufactured ones. Additively manufactured regions and mold parts, in particular if they are metal, can be identified as such by their basic structure due to the fact that they are manufactured from powder. Furthermore, they can be recognized as additively manufactured by means of layers, in particular when different materials are combined. In addition, the shape of additively manufactured regions or mold parts also allows them to be identified as such if such a shape could not be conventionally manufactured.

The use of mold parts in concrete block molds, which mold parts have been additively manufactured at least in some regions, has several advantages. Additive manufacturing, in particular 3D metal printing, allows great freedom in the design of the mold part. 3D metal printing can be used to create shapes that would not be possible using conventional methods, such as undercuts. Tool-related limitations of conventional manufacturing processes, such as a limited selection of milling tools, which would be associated with limited radii, do not apply to 3D metal printing. Additive manufacturing can be used, for example, to form protruding embossing without milling radii. In addition, many shapes can also be produced more easily than with conventional manufacturing, for example cavities. Complex mold part groups composed of a plurality of mold parts can be printed in one piece, so that the number of mold parts in the concrete block mold can be reduced. The topology optimization for the mold parts can be done with the support of the finite element method (FEM).

The additively manufactured mold parts offer increased functionality compared to conventionally manufactured ones. Geometric contours that cannot be conventionally manufactured can be easily produced using 3D printing. Additively manufactured cavities result in weight savings and an increase in dynamic strength properties. Furthermore, embedded additional functions can be provided by additive manufacturing in order to form heatable mold parts in this way. The mold part can be designed to accommodate a heating element and/or has a heating channel. Heated mold parts, in particular pressure plates, reduce the extent to which the concrete mixture sticks to the surface of the mold part and achieve easier detachment of the concrete mixture. Overall, additive manufacturing not only allows shapes and contours, but also surface structures to be formed more easily than with conventionally manufactured mold parts.

For example, scanned natural stone surfaces can be reproduced almost exactly. Structured surfaces having a high level of detail and particularly fine embossing, which conventionally could only be milled with micro tools, can also be formed in this way.

A further advantage is that the mold part having an additively manufactured region or the additively manufactured mold part saves material in manufacturing, waste is minimized, and cutting is not required.

In one embodiment, the mold part can have both a conventionally manufactured, milled or cast region and the additively manufactured region, which can be associated with a combination of different materials.

In one embodiment, the mold part that is additively manufactured at least in some regions has a first region made of a first material and a second region made of a second material. At least one of the two regions is additively manufactured. Both regions are advantageously manufactured additively, so that the additively manufactured region can comprise the first and the second region. These designs offer the possibility of combining different materials in one mold part, for example to print regions that are particularly subject to abrasion with harder materials.

The use of a harder, more stable material is particularly suitable for regions on the upper face of the lower mold part, in which the pressure plates engage, and on the lower face of the lower mold part and of the upper mold part, which rests on the base or which engages in the mold cavities. Mold parts that are less subject to frictional wear are printed with a material that has a high tensile strength, for example the mold parts of the frame.

The first and the second material are selected with regard to the function and load of the corresponding regions. Thus, the first material may be a material from the group consisting of wrapping material, filling material, and support material, and the second material may be another material from the group consisting of wrapping material, filling material, and support material. Of course, more than two different materials can also be combined. The wrapping material is used on the functional surface of the mold part. It is advantageously wear-resistant. The formation of a non-stick region is also conceivable. The filling material fills up free volumes in the mold part. It is usually light and readily printable. The support material is used for regions that are subject to higher forces, such as stiffening. It should have a high degree of strength.

The use of the mold part having an additively manufactured region in a concrete block mold has another advantage in the event of wear, where wear does not only mean material wear and tear over time, but also defects of all kinds. It is not necessary to replace the entire mold part if it is only worn out in some regions. Rather, it is sufficient to simply replace the additively manufactured, worn region and rebuild it, for example, by means of additive manufacturing. The additively manufactured region can therefore also be described as a replaceable wear volume. Mold parts having a wear volume allow further modularization of groups of mold parts that are subject to wear beyond their individual mold parts, so that the corresponding concrete block mold can be regarded as a further modularized molding tool.

Additively manufactured regions that are replaceable are regions of the mold parts that are in direct engagement with one another, in particular the upper edge of the lower mold part in the main compaction region, core upper faces, pressure plate surface and pressure plate chamfer as well as blade surface and blade tip. The pressure plate surface is the face of the pressure plate that faces the cavity. Its chamfer is the chamfered edge region, which is particularly loaded during lowering into the cavity and by shaking. The chamfers of the cavity edges, in order to prevent or mitigate the striking of the pressure plates, are also exposed to loads. A blade is a pressure plate, one edge of which, when the pressure plate is lowered, extends along the cavity wall in a tapered manner to form a shaped block having an oblique face.

With regard to the wear to be expected and the expected useful life, the material for the concrete block mold and its mold parts which have been additively manufactured at least in some regions can be selected. The choice of material can depend on weardependent printing parameters and raw materials. Concrete block molds that are expected to be used in only a few cycles can be made of a different material or a different combination of materials than standard molds that are designed for a high number of cycles, or even concrete block molds for special applications. If the concrete block mold is planned to be used for only a few cycles, a cheap, easy-to-handle material can be selected, which is associated with a simpler 3D printing process. However, the mold part of such a concrete block mold is not as strong as those described below. In the case of a standard mold for a high number of cycles, the choice of powder for the 3D printing of the mold parts is optimized with regard to the highest strength and useful life values. Additional measures to increase strength, such as heat treatment and coating, can be carried out during manufacture in order to achieve a longer service life for the concrete block mold. In the case of special applications, the material is selected with regard to the special application. For example, higher-quality metal types can be selected for particularly abrasive types of concrete, even if 3D metal printing is more difficult and complex for such types of metal.

Some embodiments are explained in more detail below with reference to the drawings.

FIGS. 2A, 2B and 2C show an embodiment of a mold part in a three-dimensional representation, in a side view and in a detailed representation of the side view.

Figure 1:
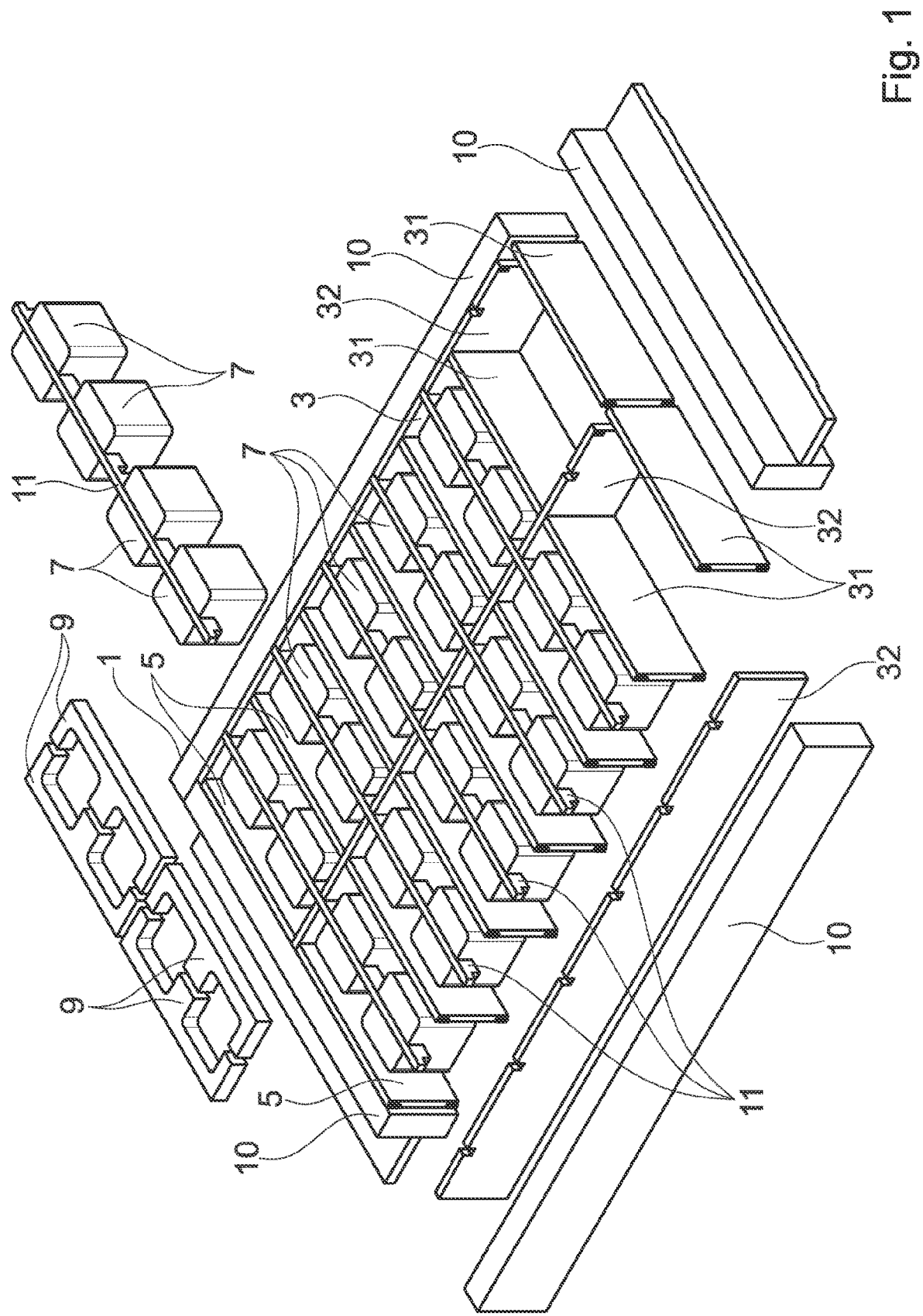
FIG. 1 shows an embodiment of a modular concrete block mold in an exploded representation.

In the drawings, the same or functionally equivalent components are provided with the same reference signs.

FIG. 1 shows an embodiment of a modular concrete block mold in an exploded representation. The concrete block mold comprises a lower mold part and an upper mold part. For the sake of clarity, the lower mold part and only parts of the upper mold part that come into contact with the concrete mixture when the concrete block is being manufactured are shown. With the concrete block mold shown, a plurality of hollow blocks can be formed at the same time.

The lower mold part has a frame 1 consisting of a plurality of mold parts 10. The frame 1 surrounds an insert 3 which is composed of a plurality of mold parts 31, 32. The insert 3 has a plurality of recesses 5, which are designed as mold cavities, also referred to as block cavities. In this embodiment, the concrete block mold has twelve cavities in two rows. The mold parts 31, 32 of the insert 3 comprise longitudinal walls 32 which extend along the length of the insert. Transverse walls 31 are inserted between the longitudinal walls 32. Cores 7 in the recesses 5 are used to form the hollow spaces in the hollow blocks to be manufactured. In this embodiment, two cores 7 are provided for a recess 5 in each case. The cores 7 are fastened in rows to a core holding strip 11 which in turn is fastened to the frame 1. The cores 7 and the core holding strips 11 are also mold parts. The mold parts 7, 11, 10, 31, 32 can be connected to one another, for example by tongue and groove connections and/or plug connections and/or screw connections, in order to form the lower mold part of the modular concrete block mold.

The upper mold part (not shown in its entirety), which comprises a plurality of pressure plates 9, is arranged opposite the recesses 5. The dimensions and shape of the pressure plates 9 correspond to the area between the recess contour and the core contour and can be lowered into the recess 5 so that they move past the core upper face. The pressure plates 9, as components of the upper mold part, are connected to form a unit (not shown) via plungers and a plate. The pressure plates 9 are, like the other parts, e.g. the plungers and plate, which are mounted to form the upper mold part of the concrete block mold, also mold parts.

A concrete mixture is poured into the recesses 5 when the block is being manufactured. The concrete mixture is compacted by shaking, during which the fill level of the concrete mixture is reduced and the pressure plates 9 press on the concrete mixture and are thus further lowered. The region between the mixture fill level in insert 3 before and after compaction is also referred to as the main compaction region. The main compaction region is in the upper region of the lower mold part. Due to the combination of shaking and lowering the pressure plates 9 during compaction, the mechanical load of the mold parts 31, 32 of the insert 3 in the main compaction region is particularly high. This also applies to the upper region of the cores 7.

The concrete block mold has mold parts 7, 9, 10, 11, 31, 32 which have been additively manufactured at least in some regions. The corresponding mold parts 7, 9, 10, 11, 31, 32 can be additively manufactured entirely or only in some regions. In addition, the concrete block mold can also have mold parts 7, 9, 10, 11, 31, 32 that are manufactured entirely conventionally.

Due to the modular design of the concrete block mold, it is possible to replace a mold part 7, 9, 10, 11, 31, 32, even if it is manufactured entirely conventionally, with an additively manufactured mold part 7, 9, 10, 11, 31, 32. In this way, a replacement mold part can be manufactured in a simple manner using 3D metal printing. Of course, the replacement mold part can also be additively manufactured only in some regions. If there is only local wear of a mold part 7, 9, 10, 11, 31, 32, the affected mold part 7, 9, 10, 11, 31, 32 can be adapted, i.e. it is refurbished and reused. During the adaptation, the shape of the mold part in the non-worn state, i.e. the original shape of the mold part, is restored by additive manufacturing using 3D metal printing. In the case of a mold part 7, 9, 10, 11, 31, 32 of which the additively manufactured region is worn, the adaptation can be made by replacing the additively manufactured region.

In general, in the case of the concrete block mold, the upper regions of the mold parts 7, 10, 11, 31, 32 in the lower mold part and the lower face, which is also referred to as the surface, and side regions of the pressure plates 9 wear out. This is because the plunging pressure plate 9 strikes the top region of the insert 3. A concrete block mold has a specific mold height, for example 88 mm, to produce a desired block height; following the example above this would be 80 mm. When the block is being manufactured, the entire concrete block mold is filled with concrete up to the mold height of 88 mm. The pressure plates 9 then begin to plunge into the recesses 5 under pressure and to compress the mixture. At the same time, there is strong shaking from below, which is also known as shock vibration. The concrete mixture only reaches its necessary strength when the pressure plates 9 have reached the block height of 80 mm.

This means that the upper region of the concrete block mold between the mold height and the block height, which is 8 mm wide and is also known as the main compaction region, is subjected to the most load and consequently wears out the fastest. FIGS. 2A, 2B, 2C and 3 show mold parts 31, 7 from the concrete block mold, in which precisely these regions are armored against the loads described above by additively manufactured regions.

FIGS. 2A, 2B and 2C show an embodiment of a mold part 31, which has additively manufactured regions, in a three-dimensional representation, in a side view and as a detailed representation of the upper region of the side view. The mold part 31 is a transverse wall of the insert 3 of the concrete block mold.

The metal mold part 31 designed as a transverse wall has a rectangular base surface having laterally extending fastening means 13 for engaging in the adjacent, transverse longitudinal walls 32. On an upper region of the mold part 31, which faces the upper mold part of the concrete block mold in the assembled state, the mold part 31 has chamfers 15 as obliquely extending upper edges at the front and rear.

In the upper region, the mold part 31 has strip-shaped, additively manufactured first regions 17 on the front face and the rear face. The additively manufactured first regions 17 are 3D metal printing regions and also form the chamfers 15. The strip-shaped first regions 17 extend over the entire length of the transverse wall and at least along the main compaction region in which the mold part 31 is exposed to particular loads. The second region 19 of the mold part 31 beyond the first regions 17 can be conventionally manufactured, for example milled or cast. In an alternative embodiment, the second region 19 is also an additively manufactured 3D metal printing region of which the material, however, differs from that of the first region 17. The connection between the regions 17, 19 can be made by any suitable means, for example welded joints, adhesively bonded joints, fastening means such as screws or, preferably, by one of the regions 17, 19 having been printed on top of the other.

The additive manufacturing of the mold part 31 at least in some regions allows different materials to be used for the different regions 17, 19 of the mold part 31, the materials being optimized with regard to the different requirement aspects of the regions 17, 19.

The abrasively loaded first regions 17 are made of a more resistant, more stable material than the second region 19.

When the first regions 17 wear out, it is not necessary to replace the entire mold part 31, but it is sufficient to merely adapt the mold part 31 by only the additively manufactured first regions 17 being replaced with new additively manufactured regions and/or being rebuilt by means of 3D metal printing.

Figure 3:
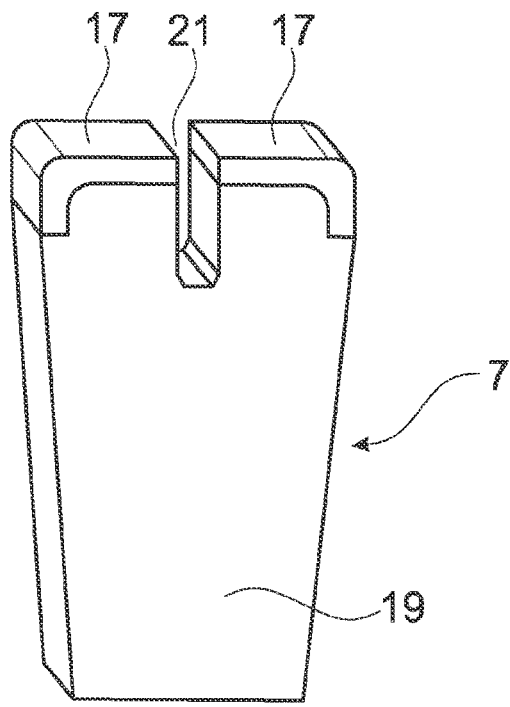
FIG. 3 shows a further embodiment of a mold part in a three-dimensional representation.

FIG. 3 is a three-dimensional representation of an embodiment of a mold part 7 which has regions that are additively manufactured. The mold part is a core 7 of the concrete block mold. On its upper face is a gap 21 in which the core holding strip 11 engages. The edges of the core upper face facing away from the gap 21 are rounded in order to facilitate the lowering of the pressure plate 9 along the core 7 and to prevent the pressure plates 9 from striking. On both faces of the gap 21, the core upper face has first regions 17 that are additively manufactured and extend beyond the rounded edges.

The upper face of the core 7 is exposed to large loads due to the pressure plates 9 lowering over said core and possibly striking it, in combination with the shaking. The additively manufactured first regions 17 are made of a harder material than the second region 19, which forms the core body. The second region 19 can be manufactured conventionally or additively, and different materials can be combined for the body and upper face, as has already been described in connection with the previous embodiment.

When the first regions 17 wear out, it is not necessary to replace the entire mold part 7, but it is sufficient to merely adapt the mold part 7 by only the additively manufactured first regions 17 being replaced with additively manufactured regions and/or being rebuilt.

Figure 4:
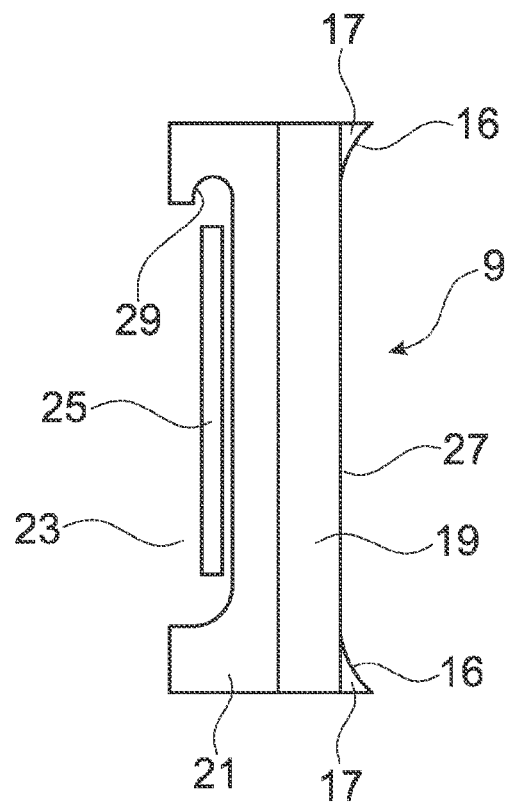
FIG. 4 shows a section through a further embodiment of a mold part.

FIG. 4 shows a section through an embodiment of a pressure plate 9 having a rectangular base surface, such as can be used for printing paving blocks.

The pressure plate 9 has a negative chamfer 16 at the edge, which is designed as a protruding region having a triangular contour in order to form a chamfered edge of the block. The chamfer 16 is an additively manufactured first region 17 on a second region 19 that extends over the entire mirror 27. The first region 17 is made of a harder material than the second region 19. The material of the second region 19 is a non-stick wrapping material. On the face of the second region 19 facing away from the first region 13, an additively manufactured third region 21, which has a planar recess 23, is applied. A component for an additional function, for example a planar heating element 25, can be introduced into the recess, so that the pressure plate 9 can be heated. The third region 21 has an undercut 29 which can engage in another mold part. The heating element 25 supports the non-stick properties of the pressure mirror 27, since the concrete mixture, which has dried slightly on the surface as a result, is more easily detached.

Figure 5:
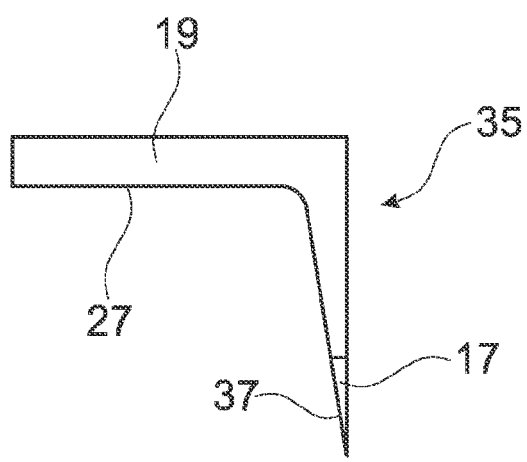
FIG. 5 shows a further embodiment of a mold part in a side view.

FIG. 5 shows a further embodiment of a mold part, which is designed as a blade 35, in a side view. The blade 35 is a distinctively shaped pressure plate that has an edge portion which, when the blade is lowered into the cavity, extends along the mold cavity wall in a tapered manner to form a block having an oblique face, for example a curb. The surface 27 of the blade 35 forms the mold cavity. An additively manufactured first region 17 forms the blade tip 37, which is made of a harder, more stable material than the second region 19, which forms the blade body with the surface 27. The first region is a replaceable wear volume.

The features indicated above and in the claims, as well as the features which can be seen in the figures, may be advantageously implemented both individually as well as in various combinations. The invention is not limited to the embodiments described, but may be modified in many ways within the scope of expert knowledge.

LIST OF REFERENCE SIGNS

1 Frame
3 Insert
5 Recess
7 Core
9 Pressure plate
10 Mold part
11 Core holding strip
13 Fastening means
15 Chamfer
17 First region
19 Second region
21 Third region
23 Recess
25 Heating element
27 Surface
29 Undercut
31 Mold part
32 Mold part
35 Blade
37 Tip

The invention claimed is:

1. A modular concrete block mold comprising
a lower mold part, which comprises a frame comprising a plurality of frame parts detachably connected to one another without welding,
an insert comprising a plurality of insert parts detachably connected to one another or to the frame without welding, and a plurality of mold cavities adapted to be filled by a concrete mixture,
an upper mold part comprising a stamping unit for compacting the concrete mixture in the plurality of mold cavities, the stamping unit comprising a plurality of pressure plates detachably and indirectly connected to one another without welding and designed to engage in the plurality of mold cavities,
wherein the lower mold part or the upper mold part has an additively manufactured region or is an entirely additively manufactured mold part, and
wherein the additively manufactured region or the entirely additively manufactured mold part has a layered structure or is protruding embossing without milling radii or has an undercut or has a cavity, and
wherein the additively manufactured region is a 3D metal printing region or the entirely additively manufactured mold part is additively manufactured by 3D metal printing.

2. The mold according to claim 1, wherein the lower mold part or the upper mold part has a milled or cast region and the additively manufactured region.

3. The mold according to claim 1, wherein the lower mold part or the upper mold part has a first region made of a first material and a second region made of a second material, wherein at least the first region is additively manufactured.

4. The mold according to claim 3, wherein the first material is configured for use as a wrapping material, as a filling material, or as a support material, and the second material is another material configured for use as a wrapping material, as a filling material, or as a support material.

5. The mold according to claim 1, wherein the additively manufactured region has at least some non-stick regions or the entirely additively manufactured mold part has at least some non-stick regions.

6. The mold according to claim 1, wherein the lower mold part or the upper mold part has the undercut.

7. The mold according to claim 1, wherein the lower mold part or the upper mold part has the cavity.

8. The mold according to claim 1, further comprising a heating element or a heating channel in the lower mold part or the upper mold part.

9. The mold according to claim 1, wherein the additively manufactured region is an edge region of the lower mold part or the upper mold part.

10. The mold according to claim 3, wherein the first region is an edge region of the lower mold part or the upper mold part.

11. The mold according to claim 1, wherein at least one pressure plate of the plurality of pressure plates is a blade.

12. The mold according to claim 11, wherein the additively manufactured region forms a pressure plate surface or a chamfer or a blade surface or a blade tip.

13. The mold according to claim 11, wherein the additively manufactured region forms a chamfer or a blade surface or a blade tip.

\* \* \* \* \*